(12) United States Patent
Smirnov et al.

(10) Patent No.: US 8,561,054 B2
(45) Date of Patent: Oct. 15, 2013

(54) METHOD FOR UPDATING SOFTWARE COMPONENTS

(75) Inventors: Mikhail Smirnov, Unterfoehring (DE); Uwe Krueger, Haar (DE); Moritz Schnizler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 32 days.

(21) Appl. No.: 13/215,911

(22) Filed: Aug. 23, 2011

(65) Prior Publication Data

US 2011/0307336 A1    Dec. 15, 2011

Related U.S. Application Data

(63) Continuation of application No. PCT/EP2010/001991, filed on Mar. 30, 2010.

(30) Foreign Application Priority Data

Apr. 27, 2009    (DE) .......................... 10 2009 018 761

(51) Int. Cl.
*G06F 9/44*    (2006.01)

(52) U.S. Cl.
USPC ............ 717/171; 717/168; 717/120; 717/121

(58) Field of Classification Search
None
See application file for complete search history.

(56) References Cited

U.S. PATENT DOCUMENTS

| 5,442,553 | A   |   | 8/1995 | Parrillo |
|-----------|-----|---|--------|-----------------|
| 6,820,259 | B1  |   | 11/2004 | Kawamata et al. |
| 7,142,962 | B1  |   | 11/2006 | Pflieger et al. |
| 7,506,309 | B2  | * | 3/2009 | Schaefer ...................... 717/120 |
| 2009/0119657 | A1 |   | 5/2009 | Link, II |

FOREIGN PATENT DOCUMENTS

| DE | 10 2008 036 711 A1 | 2/2010 |
| WO | WO 2007/098781 A1 | 9/2007 |

OTHER PUBLICATIONS

International Search Report dated Jul. 2, 2010 with English translation (four (4) pages).

* cited by examiner

*Primary Examiner* — Don Wong
(74) *Attorney, Agent, or Firm* — Crowell & Moring LLP

(57) ABSTRACT

A method is provided for updating at least one software component of a motor vehicle. The method operates such that the updating of the software component to be updated is offered to the driver by a service facility outside the vehicle before updating is executed. The updating can be enabled solely by the driver of the motor vehicle in response to the offer. The transmission of vehicle configuration information and identification data to the service facility takes place repeatedly in a time controlled and/or event controlled manner without the involvement and/or notification of the driver.

14 Claims, 1 Drawing Sheet

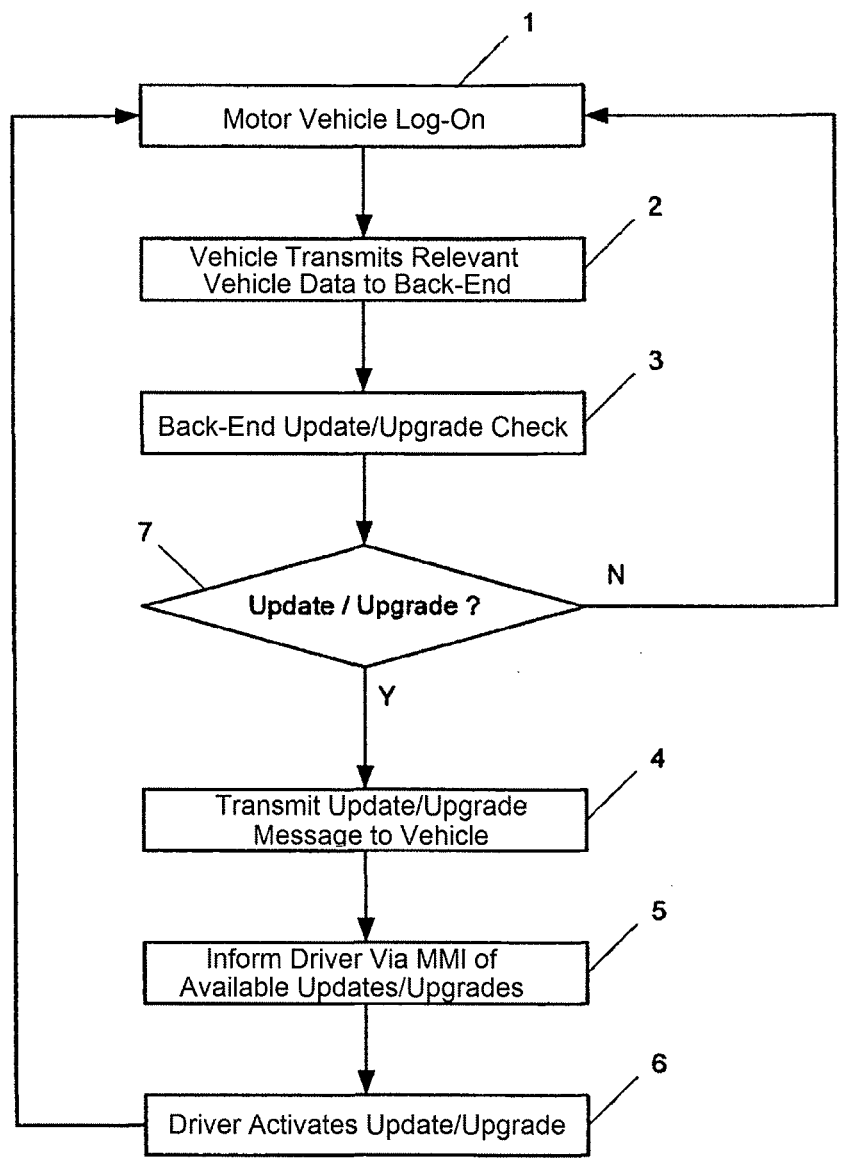

METHOD FOR UPDATING SOFTWARE COMPONENTS

CROSS-REFERENCE TO RELATED APPLICATIONS

This application is a continuation of PCT International Application No. PCT/EP2010/001991, filed Mar. 30, 2010, which claims priority under 35 U.S.C. §119 from German Patent Application No. DE 10 2009 018 761.8, filed Apr. 27, 2009, the entire disclosures of which are herein expressly incorporated by reference.

BACKGROUND AND SUMMARY OF THE INVENTION

The invention relates to a method for updating at least one software component of a motor vehicle. The method includes at least the steps of: determining the vehicle configuration information, which includes information about which hardware components and/or which software components are present in the actual motor vehicle, by a status determining device; providing a telecommunication link between a service interface inside the vehicle and a service facility outside the vehicle; transmitting the vehicle configuration information, determined by the status determining device, and the identification data of the motor vehicle in question to the service facility outside the vehicle by way of the telecommunication link; checking by the service facility outside the vehicle using the vehicle configuration information, whether one or more software components should be updated according to an inspection protocol available to the service facility outside the vehicle; providing a corresponding update specification by the service facility outside the vehicle; and updating the software components to be updated using the update specification.

Motor vehicles, according to the current state of the art, have a plurality of electronic control units that comprise not only hardware components but also software or, more specifically, software components. At the present time motor vehicles have an average service life of several years. Over this period of time (also called the life cycle of the motor vehicle), changes in technology require "intervention" in parts of the software, in particular, replacement of, addition to, or expansion of, the software, that is, of certain software components or software based functions. An "intervention" of this type is referred to below as the updating of software components. If desired, these individual updating measures can be differentiated between updates, in which the previously specified range of functions usually remains essentially the same, and upgrades, in which the specified range of functions is usually expanded, thus, an increase in functions. One possible reason for the need to update/upgrade can be, for example, the modified requirements regarding the connection to external devices, in particular, accessories.

An updating of software components usually correlates to a change in the configuration data of the motor vehicle.

Methods for implementing the updating of software components in motor vehicles, in particular, methods of the type described in the introductory part of the specification, are already known from the prior art, for example, WO 2007/098781 A1. However, the prior art methods still exhibit serious disadvantages with respect to the total amount of time and effort that it takes to inform in a simple and efficient way all motor vehicles, in which a specific updating measure should be performed, about this fact and to execute an updating measure, which is deemed to be necessary, with ease, high reliability and very little technical complexity.

The object of the invention is to provide a simple and reliable method for updating software components in motor vehicles at a low total cost.

This and other objects are achieved according to the invention, wherein the actual updating of a software component that is to be updated is enabled exclusively by the driver of the motor vehicle. In order to induce the driver to perform a respective enabling action, the updating of the software component to be updated is offered to the driver by the service facility outside the vehicle before said updating is executed. This feature can be implemented, for example, by transmitting an electronic message into the vehicle and its display in the MMI (man-machine interface) of the motor vehicle. Then, the enabling can be authorized by a confirmation action on the part of the driver, for example, by selecting a confirmation answer (for example, "O.K." or "start updating"), that is shown to the driver simultaneously with the transmitted message in the MMI. In strong contrast to the updating that can be enabled solely by the driver, the invention provides that the transmission of the vehicle configuration information and the identification data takes place repeatedly in a time controlled and/or event controlled manner without the involvement and/or notification of the driver.

In other words, comprehensive measures for preparing the actual updating are initiated without the driver's awareness, before obtaining the driver's enabling input to execute the actual updating. Thus, the driver maintains control over the software updating, because the actual updating takes place only after his enabling input. However, at the same time the driver is not bothered with messages, instructions and/or demands with respect to the transmission of the vehicle configuration information and the identification data, because from his point of view it takes place unobtrusively "in the background" and without his assistance. The total cost with respect to the actions and/or notifications of the driver is reduced by the invention.

The method according to the invention is based on a slight shift away from the generally untouched prior art approach of leaving to the driver the control over the data communication between his vehicle and the service facility outside the vehicle. However, this departure goes only so far that the vehicle configuration information and the vehicle identification are transmitted to the service facility, so that it can plan and suggest the individual updating measures for the vehicle concerned. Preferably, the active software components of the motor vehicle are not changed, removed and/or added without the assistance of the driver.

As used herein, the term "involvement of the driver" is defined, unless stated otherwise, as the involvement in the particular case, that is, at each individual transmission operation. Further below it will be explained that the necessity for a single non-recurring involvement of the driver, for example, in the form of an MMI controlled activation of a service, that then triggers a plurality of transmission operations may be advisable and, by all means, practical.

In order to satisfy the requirements with respect to protecting personal data against misuse in data processing, the transmission of the vehicle configuration information and the identification data is done preferably over a secure link or rather in an encoded form.

In order to satisfy even more comprehensively the requirements with respect to protecting personal data against misuse in data processing, the vehicle configuration information and the identification data are automatically deleted at the service facility outside the vehicle immediately after said data have been processed (or after the expiration of a predefined period of time).

The invention allows each vehicle, which is logged on to the service facility outside the vehicle (and which sends its vehicle configuration information and identification data), to be checked individually as to whether it needs software updates and/or upgrades; and the invention allows the actually required updates/upgrades to be performed individually for each vehicle. A comparable service quality cannot be achieved by means of fleet based checking and notification measures. At first glance it may appear that the data communication traffic for repeated transmission of the vehicle configuration information to the service facility outside the vehicle is disadvantageous or even stands in the way of a practical implementation, but this drawback is counterbalanced by the advantages of the method and can be limited, if desired, to a reasonable amount by a suitable selection of data and/or suitable data processing and/or a coordinated transmission timing of the individual vehicles of a vehicle fleet. The additional costs associated with the method are compensated at least partially by the reduced warranty costs and increased customer satisfaction.

The vehicle configuration information comprises, optionally in list format, preferably data about one or more of the following categories:

(1) data regarding the hardware components currently and/or originally installed in the vehicle, (2) data regarding the software components currently and/or originally present in the vehicle, and (3) correlation between the hardware components currently and/or originally installed in the vehicle and the software components currently and/or originally present in the vehicle.

The identification data items include preferably an unambiguous vehicle identification number, for example, the vehicle chassis number. Additional information regarding the origin of the vehicle, especially information regarding the manufacturer, model, time and/or time period of manufacturing, batch, etc. is contemplated. Similarly a so-called vehicle order, that is, a vehicle description or, more specifically, a respective production order, is also contemplated.

However, as an alternative or in addition, it is also possible to use an identifier, issued especially for remote maintenance service, for example, a user name that is issued for this purpose.

Not only the vehicle configuration information and the identification data, but also other vehicle data, in particular, the error memory contents, the maintenance relevant vehicle data, the operation relevant vehicle data, the safety relevant vehicle data and/or the vehicle data regarding the use of software based functions of the motor vehicle, can be transmitted to the service facility outside the vehicle.

The vehicle configuration information can be automatically preprocessed on the vehicle side to the effect that said information is compressed and/or reduced to information that may be relevant for the software updating. This strategy allows the data sets that are to be transmitted to be reduced; or when the total quantity of data regarding frequent vehicle configuration information is constant, it can be sent to the service facility outside the vehicle.

The automatic preprocessing can be performed on the vehicle side by way of a status determining device, or as an alternative also by an additional computer of the vehicle, using a compression and/or filter specification. Such a compression and/or filter specification can be stored permanently in the vehicle, but can also be transmitted into the motor vehicle by the service facility outside the vehicle.

An automatic preprocessing can also take place to the effect that only changes, to some extent an increment or rather delta, with respect to an earlier vehicle configuration are determined and transmitted to the service facility outside the vehicle. Then, the vehicle configuration information regarding the earlier vehicle configuration remains stored at the service facility outside the vehicle and is allocated to the transmitted increment (or delta) by means of the identification data or by means of allocation data sent with it specifically for this purpose. In this way, too, the data set to be transmitted can be significantly reduced. Or, more specifically, when the total quantity of data regarding frequent vehicle configuration information is constant, it can be sent to the service facility outside the vehicle.

An additional possibility for significantly reducing the data set to be transmitted in the particular case consists of specifying and transmitting only one unambiguous identification code for a specific vehicle configuration, in particular, a hash total. Especially in cases, where a specific vehicle configuration has already been transmitted in its entirety to the service facility outside the vehicle at an earlier time, and optionally the service facility outside the vehicle has already checked on the basis of this vehicle configuration as to whether there is a need for updating; and/or an updating specification, has been made available (however, the updating according to the updating specification, has not been done yet), the future procedural requirement can be reduced, for example, as follows. First, an identification code, which clearly characterizes this vehicle configuration, for example, the hash total for checking purposes of the transmitted vehicle configuration, can be stored on both the vehicle side and also the side of the service facility outside the vehicle. Furthermore, the identification code, which can be stored on the side of the service facility outside the vehicle, can relate by choice not only to the actual vehicle configuration, but also to the updating specification, which is made available on the basis of said vehicle configuration. Consequently, one need only match the identification codes on both sides, instead of having to transmit anew the entire vehicle information (or rather instead of having to check anew as to whether there is a need to update and/or having to provide anew an updating specification). As long as the identification codes remain unchanged on both sides, no additional measures are necessary. If, however, the identification code transmitted from the vehicle changes as a consequence of a change in the vehicle configuration, then correspondingly new (detailed or rather complete) vehicle configuration information has to be transmitted to the service facility outside the vehicle. If the identification code, stored at the service facility outside the vehicle, changes, for example, as a consequence of the recent availability of a certain update/upgrade, then at a minimum it is necessary to check once again whether there is a need to update, and/or whether it is necessary to provide anew an updating specification.

Therefore, one preferred example of the vehicle configuration information, which is determined and transmitted according to the invention, consists of a hash total, which is calculated for checking purposes of the respective vehicle configuration and which clearly characterizes this vehicle configuration.

The transmission of the vehicle configuration information and the identification data takes place repeatedly in a time controlled and/or event controlled manner.

The time control makes it possible to guarantee, for example, a maximum time delay between the availability of a new software component at the service facility outside the vehicle and a corresponding updating offer to the driver.

In addition, a time control allows the data communication traffic among a plurality of motor vehicles to be coordinated such that specific limit values of manageable data sets are not exceeded. For this purpose the vehicle configuration information is transmitted periodically for each vehicle from a plurality of motor vehicles, wherein the transmission times of the individual vehicles within this period are distributed as uniformly as possible. The period and/or the transmission times can be established when the vehicle is originally configured at the factory and/or at a later date. In order to observe a predetermined "schedule," the motor vehicle has preferably a clock and/or a timer. Any subsequent (that is, not originally set at the factory) configuration of the transmission behavior of the motor vehicle over time can be done either locally in a service shop or by way of a wireless link from a central service center. In this case the central service center can be the aforementioned service facility outside the vehicle. The wireless link can be the same link that is also used for the transmission of the configuration information and identification data and/or for the transmission of updates/upgrades into the motor vehicle.

Preferably the transmission of the vehicle configuration information and the identification data can also be totally deactivated or activated from the central service center, which can be, in particular, the aforementioned service facility outside the vehicle.

In contrast to a time controlled operation, an event controlled operation makes it possible to react to specific events, in particular in real-time.

The triggering event may be defined, for example, as the vehicle sided recognition of a change in a hardware and/or software component of the motor vehicle. Then, for example, after the control unit has been replaced in a shop that does not have the appropriate programming means, the service facility outside the vehicle can offer to the driver the service of loading "over the air" the software required for the safe operation of the vehicle.

The triggering event may also be defined as the initial and/or repeated connection of a specific accessory, in particular, a mobile telephone, an audio/video player or a portable computer, to the motor vehicle. Then the driver can be offered in real-time the service of loading the driver and/or the integration software components, which are appropriate for the accessory, into the vehicle.

The triggering event may also be defined as the overshooting of a specific tire tread road worthiness limit and/or the refuelling of the vehicle. Thus, it can be ensured that preferably vehicles that have seen considerable use receive updating offers.

The triggering event may also be defined as the crossing of a country border or the approaching of a country border. Thus, it can be ensured that the updates/upgrades, which are especially appropriate and/or are prescribed for a specific country, are offered in due time to the driver.

The triggering event may also be defined as putting the motor vehicle back on the road after a prolonged period of nonuse and/or as the restoration of the wireless reachability by the service facility outside the vehicle after a prolonged break in this reachability. Thus, upon resuming the use of his vehicle, the driver of a vehicle, which has been parked, for example in an underground garage for a prolonged period of time, can be offered as fast as possible the service of upgrading his vehicle to the latest software version.

The triggering event may also be defined as the vehicle sided recognition of, for example, an MMI ordered updating request of the driver. However, an alternative embodiment of the present invention intentionally does not provide the driver the possibility of ordering such an updating request, in order to free the driver completely of any ideas about the necessity of updating the software.

The triggering event may also be defined, if desired, as the receipt of a vehicle specific trigger signal that is transmitted from a service facility outside the vehicle or from a different service facility. In this way the service facility outside the vehicle or a different service facility could control, subject to a reaction of the triggered vehicles, which vehicles shall be checked for the availability of software updating at which time. It appears to be especially advantageous to provide for this purpose the conditions that the control unit outside the vehicle can send a vehicle specific trigger that results in an immediate or subsequent checking of updates/upgrades in the vehicle, exactly when a customer to be allocated with the vehicle has ordered free of charge or for a fee from an (online) software shop an application, a content, a service or a feature that is thereafter supposed to be transmitted into the vehicle, released there or made useable in the vehicle (upgrade case). However, according to an alternative embodiment of the present invention, the possibility of releasing an updating by service facilities outside the vehicle is intentionally not provided, in order to minimize the logistic costs at the service facility outside the vehicle. In the extreme case, the service facility outside the vehicle does not need to have any knowledge whatsoever as to which vehicles could be connected to it, for the purpose of checking the availability of a software updating. Without such advance knowledge it is also, of course, not possible for the service facility outside the vehicle to notify the vehicles.

Even concerns about protecting personal data against misuse in data processing that could possibly arise due to the driver's unconscious transmission of vehicle configuration information or identification data to the service facility outside the vehicle are unfounded, especially if these data items are not stored very long beyond a specific, customized updating operation at the service facilities outside the vehicle.

Preferably the transmission of the vehicle configuration information and the identification data can be totally deactivated or activated, even if it takes place in an event controlled manner, from a central service center.

As an alternative or in addition, the transmission of the vehicle configuration information and the identification data can also be totally deactivated or activated by the driver of the motor vehicle, for example, by deactivating or activating a corresponding service. The repeated transmission of the vehicle configuration information and the identification data can also take place especially on the basis of a single non-recurring MMI controlled involvement of the driver or on the basis of an MMI controlled involvement of the driver that is to be done at least at a rate of repetition that is significantly less than the rate of transmission (for example, a service that is to be reactivated daily/weekly/monthly/yearly).

The vehicle configuration information can be determined by the status determining device in a way that is well-known from the prior art. Even the wireless telecommunication link between the service interface inside the vehicle and the service facility outside the vehicle can be provided in a way that is well-known from the prior art, just as the transmission of the vehicle configuration information and the identification data to the service facility outside the vehicle and the checking performed at the service facility outside the vehicle as to whether one or more software components are to be updated according to an inspection protocol that is available there. In the case of the method according to the invention, the latter checking can correspond, for example, to the checking that is also used in known shop floor programming systems for updating individual software components.

A corresponding updating specification can be provided by the service facility outside the vehicle; and the software component to be updated can be updated by way of the updating specification preferably by specifying specific software update packages or software upgrade packages in that a title of each package is transmitted, optionally together with a brief description of the package, to the vehicle, where it is available and suitably displayed to the driver. In response to an enabling input of the driver and/or in response to a selection of specific packages from many packages that are offered with a subsequent enabling input, these packages are transmitted to the vehicle and installed therein.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic drawing of a flowchart of the process steps of an exemplary service, based on the invention.

DETAILED DESCRIPTION OF THE DRAWINGS

According to the prior art used at the present time, software based updates or upgrades in motor vehicles are implemented by a variety of engineering solutions.

There exist, inter alia, the following systems and methods:

a) Shop floor programming systems: In order to execute an update/upgrade, the motor vehicle is connected with a cable (or connected without a cable by way of a local communication network) to a shop system, which performs the programming of the motor vehicle. In this case the shop system checks the current software version by means of specific diagnostic queries, which are sent to the motor vehicle. Then the system itself checks, based on already existing information or based on a communication via a (wide area) communication network with a central system at the manufacturer, whether there are software updates/upgrades for this motor vehicle. In the case of a positive check, the shop system takes over (off board) the programming of the motor vehicle. Special programming and diagnostic interfaces act as the interface to the motor vehicle. There exist shop floor programming systems for programming the whole motor vehicle as well as for updating individual software components.

b) CD/DVD based systems: Individual control units in motor vehicles (for example, so-called head units, that is, the central navigation/entertainment system) or more specifically dedicated parts of a program in the control units can also be programmed by way of a special programming CD/DVD. For this purpose the existing CD/DVD feeders are usually used. There exist, in particular, CD/DVD based systems for programming the firmware of the navigation system of a motor vehicle.

c) USB based systems: Individual control units in motor vehicles (for example, head units or also telephone/communication control units) or more specifically dedicated parts of a program in the control units can also be programmed by way of software that is located on an external storage medium that is connected to the motor vehicle by means of a USB port.

It is necessary to download the software beforehand onto such a storage medium, for example, via the Internet and home PC. For this purpose the USB interfaces that are present in the motor vehicle are used. Known examples for the use of such USB based systems are the updating of driver software for telephone control, the updating of applications for the head unit and the updating of map data of a navigation system.

In the case of these methods and systems (shop floor programming systems, CD/DVD based systems, USB based systems), either motor vehicle configuration data or motor vehicle status data are retrieved from the motor vehicle by a central unit in order to perform a subsequent comparison of possible software updates/upgrades (in particular, handled thus in shop floor programming systems) or limits are set or no check whatsoever is made as to whether the motor vehicle software that is currently present in the motor vehicle is compatible with the software updates/upgrades, since the existing software is simply overwritten (in particular, handled thus in CD/DVD based systems and USB based systems).

In those cases, where in the course of the life cycle of a motor vehicle software or hardware has to be subjected to an update or replaced—owing to operational reasons or owing to operating errors that are identified after being put into circulation—, automotive specialists also speak about a technical action (TA). When such technical action is taken, a central system, which includes all data of motor vehicles that have already been manufactured, conducts a check as to which motor vehicles are affected by a necessary software update or by a hardware substitution. Then, the motor vehicle data can be matched with the customer data, so that the driver can be informed about the TA. However, as an alternative or in addition, it is also possible to prepare a list of the relevant motor vehicles in need of TA at the next visit to the shop. The diagnostic testing of the motor vehicle in the shop can also determine whether there is a new software version for this motor vehicle (see the above description of shop floor programming systems).

WO 2007/098781 A1 describes a telematic system or, more specifically, a tele-programming system, which allows an on-line connection of the motor vehicle to a central infrastructure by means of a preferably wireless communication network. Within the framework of technical actions a system of this type could inform the relevant motor vehicles by way of an electronic message about the need for a software update or a hardware replacement. Based on such a telematic system or, more specifically a tele-programming system, a necessary software update or a customer desired software upgrade can be performed over the wireless communication network in a manner that is comparable to the state of the art for mobile telephones and computers.

Shop floor programming systems have, in particular, the drawbacks that an updating of the software version requires that the motor vehicle make a trip to the shop, a requirement that is associated with commensurate costs (shop scheduling, loss of use for the driver, loaner vehicle) and that the driver himself cannot influence the update process, but rather the shop alone decides what is updated.

CD/DVD systems and USB based systems have, in particular, the drawbacks that usually no current motor vehicle configuration information is available at the time that a software update is made available, for which reason a software update that is supplied has to either include a compatibility description (which is quite complex in some cases) or in case of doubt cannot execute an update at all on account of the lack of information about the hardware and software that is in the vehicle at the present time, even though the software that is made available would actually be compatible. Such systems also have the drawback that the driver cannot perform an update independently and directly from the motor vehicle, but rather the software update/upgrade has to be obtained "by indirect means" (for example, acquisition of a CD/DVD or download with a PC) and then introduced into the motor vehicle.

Both shop floor programming systems as well as CD/DVD systems and USB based systems have, in particular, the drawbacks: (1) that software updates are introduced only with a delay into the motor vehicle (maintenance of the motor vehicle in the shop, customer himself collects information about available updates, information by mail/e-mail); (2) that in order for the driver to obtain real-time information about software based TA relevant motor vehicles, the data items have to be determined with a great deal of effort (preparation and management of lists) from the available data; (3) that in order for the driver to be notified (by mail or e-mail) about a software update, additional costs are incurred and additional time and effort are required (stamps, management, customer information); and (4) drivers of motor vehicles, which in the meantime have been updated with the latest software version, optionally in alternative ways and without the knowledge of the competent service facility outside the vehicle, are unnecessarily informed.

If the motor vehicle has a communication system that is capable of transmitting data (service interface inside the vehicle), then it is possible to transmit a current version of all hardware and software components (vehicle configuration information) that are originally installed in the motor vehicle at the factory and/or subsequently replaced or updated in a shop to a so-called backend system (service facility outside the vehicle) after determination of said version (by a status determining device). Since the current motor vehicle status (SW, HW and optionally relevant error memories, etc.) is frequently different from the SW and HW components originally installed at the factory, it is advisable and practical to perform such data matching at regular intervals.

As soon as the motor vehicle data are received in the backend system, each individual motor vehicle that is currently connected to the backend can be checked as to whether there are new—optional or obligatory—updates for this motor vehicle. The "on-time" checking of the received motor vehicle data makes it possible to ensure that the updating processes are triggered for the respective motor vehicle only if it is actually affected.

Referring to FIG. 1, the following example proposes the individual steps that should be used for a practical implementation of the above broadly described solution In step one (1), a motor vehicle logs on wirelessly to a communication device of the backend by use of communication technology at regular intervals, that is, time based (but optionally also event based). For this purpose, the motor vehicle may not be in the vicinity of the backend system. The backend system can comprise a single computer or also a plurality of interconnected computer units that may or may not be locally distributed (see block 1 in FIG. 1).

In step two (2), after a successful log on, a set of vehicle relevant data including a motor vehicle identification number and a description of the motor vehicle configuration, consisting of the current hardware and software components and their versions as well as all error memory entries, is transmitted to the backend system by way of an application protocol (see block 2 in FIG. 1).

In step three (3), the backend system evaluates the received data items and compares them with the compatibility and configuration data from the databases in the backend system, in order to check individually for the logged on motor vehicle whether this motor vehicle is affected by one or more updates/upgrades. This checking operation takes place for both optional and obligatory updates/upgrades (see block 3 in FIG. 1).

In step four (4), if an update/upgrade or even a plurality of updates/upgrades are necessary or rather recommended for the logged on motor vehicle, then an electronic message is transmitted to the motor vehicle (or rather its service interface inside the vehicle or an additional communication interface of the motor vehicle) (see block 4 in FIG. 1).

In step five (5), after this electronic message has been received by the motor vehicle, the driver of the motor vehicle is informed during a respective MMI dialog that (and optionally which) new updates/upgrades are available (see block 5 in FIG. 1).

In step six (6), the update/upgrade process is actively started by the driver with an operating command during the MMI dialog (see block 6 in FIG. 1).

The process steps according to blocks 1, 2 and 3 from FIG. 1 run in a preferably periodically repeating manner. The process steps according to blocks 4, 5 and 6 from FIG. 1 are executed only if an update/upgrade is actually required or recommended for the logged on motor vehicle. This feature is shown in decision block 7 where the backend decides the checking operation. If an update/upgrade is available, then the routine runs through the process steps according to blocks 4, 5 and 6. Otherwise, the routine jumps to the next process step of logging on according to block 1.

The time or frequency of the transmission can be set preferably from the backend. In this case the transmission rules may be defined, for example, as follows:

(1) time dependent triggering: the vehicle logs on to the backend after a defined period of time and transmits the data;

(2) tire tread road worthiness dependent triggering: the vehicle logs on to the backend after a defined distance travelled by the vehicle and transmits the data;

(3) event triggering: when a previously defined condition occurs, the vehicle logs on to the backend (for example, on undershooting a critical battery voltage); and/or (4) remote triggering: the vehicle can be triggered individually from the backend and can log on to the backend.

The repeated logging on of the vehicle to the backend and transmission of predefined data to the backend can be regarded as a service that runs in the vehicle.

Such a service can be switched on and off preferably from the central side, that is, from the backend. If desired, the driver may also be given the option of being able to switch the service on and off by himself by way of operating elements in the vehicle. The activation and deactivation of the service can be embedded into a concept for managing, in particular, for activating and deactivating, a plurality of services or, more specifically, an entire service package (for example, "teleservices" in the vehicles).

The implementation of the above described solution may yield, inter alia, the following advantages.

The number of motor vehicles that have to be informed about a software based technical action and/or the availability of an update/upgrade is reduced. Owing to the "on-time" checking of the actual motor vehicle status, there is no need to preselect motor vehicles for this purpose.

The complexity of managing the affected and/or potentially affected motor vehicles in the backend is reduced.

The routine matching by use of a communication device improves the up-to-dateness of the data existing (in the case of storage) in the backend with respect to the hardware and software components installed in the vehicles of a vehicle fleet.

Finally, the up-to-dateness of the motor vehicle software version is improved because the updates/upgrades can be performed at regular intervals independently of the location of the motor vehicle, that is, without the driver having to look for a shop for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for updating at least one software component of a motor vehicle, the method comprising the steps of:
   determining vehicle configuration information, which comprises information of hardware and/or software components currently present in the motor vehicle, by a status determining device in the motor vehicle;
   wirelessly transmitting, from the motor vehicle, the vehicle configuration information, determined by the status determining device, and identification data of the motor vehicle to a service facility outside the vehicle via a service interface inside the vehicle;
   receiving a corresponding update specification from the service facility outside the vehicle if one or more software components are to be updated based upon an inspection protocol; and
   updating the one or more software components to be updated using the update specification;
   wherein:
   updating of the one or more software components to be updated is offered to a driver before said updating is executed;
   updating is enableable solely by the driver of the motor vehicle in response to the offer; and
   wirelessly transmitting the vehicle configuration information and the identification data takes place repeatedly in at least one of a time controlled and event controlled manner without involvement and/or notification of the driver.

2. The method according to claim 1, wherein the transmission of the vehicle configuration information and the identification data is carried out over a secure link and/or in an encoded form.

3. The method according to claim 1, wherein the vehicle configuration information and the identification data are automatically deleted at the service facility outside the vehicle immediately after said data have been processed or after the expiration of a predefined period of time.

4. The method according to claim 2, wherein the vehicle configuration information and the identification data are automatically deleted at the service facility outside the vehicle immediately after said data have been processed or after the expiration of a predefined period of time.

5. The method according to claim 1, wherein the identification data comprise at least one unambiguous vehicle identification number.

6. The method according to claim 1, wherein not only the vehicle configuration information and the identification data, but also additional vehicle data are transmitted to the service facility outside the vehicle, the additional vehicle data including error memory contents.

7. The method according to claim 1, wherein the transmission of the vehicle configuration information and the identification data takes place repeatedly in a time controlled manner without the involvement and/or notification of the driver.

8. The method according to claim 7, wherein transmission of the vehicle configuration information and the identification data takes place cyclically in a constant cycle duration without the involvement and/or notification of the driver.

9. The method according to claim 1, wherein the transmission of the vehicle configuration information and the identification data takes place repeatedly in an event controlled manner without the involvement and/or notification of the driver.

10. The method according to claim 9, wherein a triggering event of the event controller manner is defined as an initial and/or repeated connection of a specific accessory to the motor vehicle.

11. The method according to claim 10, wherein the specific accessory is one of a mobile telephone, an audio/video player and a portable computer.

12. The method according to claim 1, wherein the repeated transmission of the vehicle configuration information and the identification data takes place on the basis of a single non-recurring MMI controlled involvement of the driver or on the basis of an MMI controlled involvement of the driver that is to be done at a rate of repetition that is significantly less than the rate of transmission.

13. The method according to claim 1, wherein the vehicle configuration information, in a case of a vehicle configuration that has not changed from a previous transmission operation, is transmitted in the form of an identification code distinctly characterizing the vehicle configuration.

14. The method according to claim 1, wherein the service facility outside the vehicle checks whether the one or more software components should be updated according to the inspection protocol available to the service facility.

* * * * *